(12) United States Patent
Shih (10) Patent No.: US 9,612,420 B2
(45) Date of Patent: Apr. 4, 2017

(54) LENS ASSEMBLY

(71) Applicants: Sintai Optical (Shenzhen) Co., Ltd., Shenzhen, Guangdong Province (CN); Asia Optical International Ltd., Tortola (GB)

(72) Inventor: Po-Yuan Shih, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

(*) Notice: Subject to any disclaimer, the term of this patent is extended or adjusted under 35 U.S.C. 154(b) by 106 days.

(21) Appl. No.: 14/522,619

(22) Filed: Oct. 24, 2014

(65) Prior Publication Data

US 2015/0116844 A1    Apr. 30, 2015

(30) Foreign Application Priority Data

Oct. 29, 2013 (TW) .............................. 102139031 A (51) Int. Cl.
G02B 9/62 (2006.01)
G02B 13/00 (2006.01)

(52) U.S. Cl.
CPC ........... *G02B 9/62* (2013.01); *G02B 13/0045* (2013.01)

(58) Field of Classification Search
CPC .................................................. G02B 13/0045
USPC ............................................................ 359/713
See application file for complete search history.

(56) References Cited

U.S. PATENT DOCUMENTS

2014/0139719 A1* 5/2014 Fukaya .............. G02B 13/0045 348/340
2015/0370042 A1* 12/2015 Chen .................. G02B 13/0045 359/713

* cited by examiner

*Primary Examiner* — James Jones
(74) *Attorney, Agent, or Firm* — McClure, Qualey & Rodack, LLP (57) ABSTRACT

A lens assembly includes a first lens, a second lens, a third lens, a fourth lens, a fifth lens and a sixth lens, all of which are arranged in sequence from an object side to an image side along an optical axis. The first lens is a biconvex lens with positive refractive power. The second lens is a meniscus lens with negative refractive power. The third lens is with positive refractive power and includes a convex surface facing the image side. The fourth lens is a meniscus lens with negative refractive power. The fifth lens is a meniscus lens with negative refractive power. The sixth lens is a meniscus lens with positive refractive power.

20 Claims, 12 Drawing Sheets

LENS ASSEMBLY

BACKGROUND OF THE INVENTION

Field of the Invention

The invention relates to a lens assembly.

Description of the Related Art

The development of high pixel number and lightweight for digital still cameras and mobile phones leads to large number requirements for lens assemblies with miniaturization and high resolution. A well-known lens assembly with five lenses cannot meet the requirement of the present. Therefore, a lens assembly with new structure is necessary in order to satisfy the demand of miniaturization and high resolution.

BRIEF SUMMARY OF THE INVENTION

The invention provides a lens assembly to solve the above problems. The lens assembly of the invention, provided with characteristics of a shortened total lens length and a larger field of view, still has a good optical performance. Also, the lens assembly of the invention can meet a requirement of resolution.

The lens assembly in accordance with an exemplary embodiment of the invention includes a first lens, a second lens, a third lens, a fourth lens, a fifth lens and a sixth lens, all of which are arranged in sequence from an object side to an image side along an optical axis. The first lens is a biconvex lens with positive refractive power. The second lens is a meniscus lens with negative refractive power and includes a convex surface facing the object side and a concave surface facing the image side. The third lens is with positive refractive power and includes a convex surface facing the image side. The fourth lens is a meniscus lens with negative refractive power and includes a concave surface facing the object side and a convex surface facing the image side. The fifth lens is a meniscus lens with negative refractive power and includes a concave surface facing the object side and a convex surface facing the image side. The sixth lens is a meniscus lens with positive refractive power and includes a convex surface facing the object side and a concave surface facing the image side.

The lens assembly in accordance with another exemplary embodiment of the invention includes a first lens, a second lens, a third lens, a fourth lens, a fifth lens and a sixth lens, all of which are arranged in sequence from an object side to an image side along an optical axis. The first lens is with positive refractive power. The second lens is with negative refractive power. The third lens is with positive refractive power. The fourth lens is with negative refractive power. The fifth lens is with negative refractive power. The sixth lens is with positive refractive power. The lens assembly satisfies the following conditions:

$0.8104 \leq f/TTL \leq 0.8201$, $-0.4290 \leq f_{123}/f_{456} \leq -0.4127$, $-14.8795 \leq f_4/f \leq -11.913$, $-2.7543 \leq f_5/f \leq -2.2539$, and $9.0882 \leq f_6/f \leq 63.4223$, wherein f is an effective focal length of the lens assembly, TTL is a distance from an object side surface of the first lens to an image plane along the optical axis, $f_{123}$ is an effective focal length of the combination of the first lens, the second lens and the third lens, $f_{456}$ is an effective focal length of the combination of the fourth lens, the fifth lens and the sixth lens, $f_4$ is an effective focal length of the fourth lens, $f_5$ is an effective focal length of the fifth lens and $f_6$ is an effective focal length of the sixth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
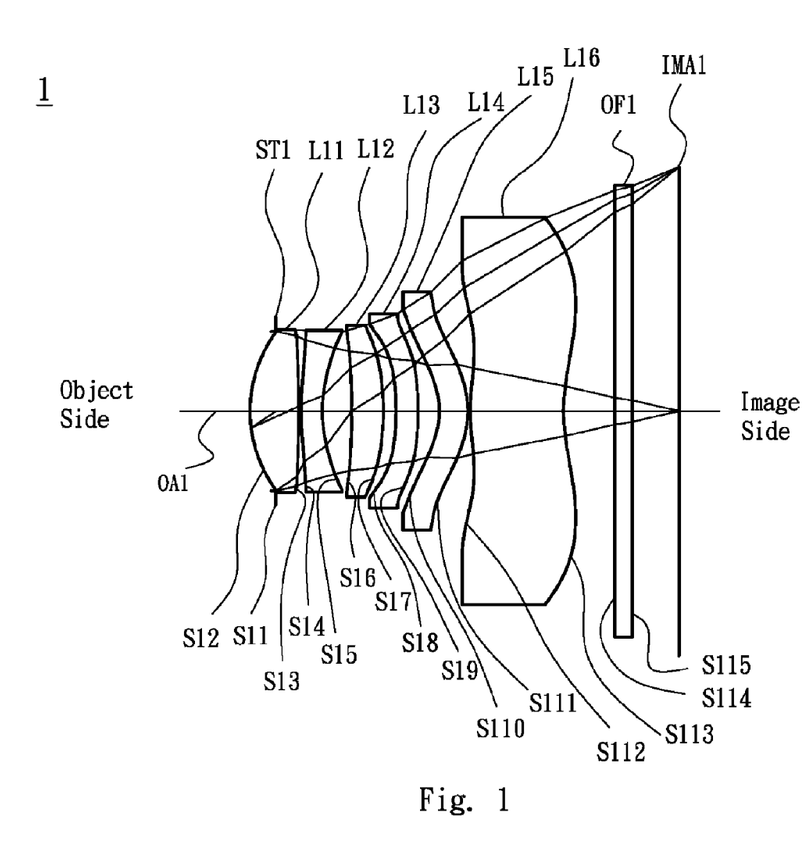
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a stop ST1, a first lens L11, a second lens L12, a third lens L13, a fourth lens L14, a fifth lens L15, a sixth lens L16 and an Optical filter OF1, all of which are arranged in sequence from an object side to an image side along an optical axis OA1. The first lens L11 is made of plastic material and with positive refractive power, wherein the object side surface S12 is a convex surface, the image side surface S13 is a convex surface and both of the object side surface S12 and image side surface S13 are aspheric surfaces. The second lens L12 is made of plastic material and with negative refractive power, wherein the object side surface S14 is a convex surface, the image side surface S15 is a concave surface and both of the object side surface S14 and image side surface S15 are aspheric surfaces. The third lens L13 is made of plastic material and with positive refractive power, wherein the object side surface S16 is a concave surface, the image side surface S17 is a convex surface and both of the object side surface S16 and image side surface S17 are aspheric surfaces. The fourth lens L14 is made of plastic material and with negative refractive power, wherein the object side surface S18 is a concave surface, the image side surface S19 is a convex surface and both of the object side surface S18 and image side surface S19 are aspheric surfaces. The fifth lens L15 is made of plastic material and with negative refractive power, wherein the object side surface S110 is a concave surface, the image side surface S111 is a convex surface and both of the object side surface S110 and image side surface S111 are aspheric surfaces. The sixth lens L16 is made of plastic material and with positive refractive power, wherein the object side surface S112 is a convex surface, the image side surface S113 is a concave surface and both of the object side surface S112 and image side surface S113 are aspheric surfaces. Both of the object side surface S114 and image side surface S115 of the optical filter OF1 are plane surfaces.

In order to maintain excellent optical performance of the lens assembly in accordance with the first embodiment of the invention, the lens assembly 1 must satisfies the following six conditions:

$$0.8104 \leq f1/TTL1 \leq 0.8201 \quad (1)$$

$$0.1375 \leq |(R1_{41}-R1_{42})/(R1_{41}+R1_{42})|+|(R1_{61}-R1_{62})/(R1_{61}+R1_{62})| \leq 0.1694 \quad (2)$$

$$-0.4290 \leq f1_{123}/f1_{456} \leq -0.4127 \quad (3)$$

$$-14.8795 \leq f1_4/f1 \leq -11.913 \quad (4)$$

$$-2.7543 \leq f1_5/f1 \leq -2.2539 \quad (5)$$

$$9.0882 \leq f1_6/f1 \leq 63.4223 \quad (6)$$

wherein f1 is an effective focal length of the lens assembly 1, TTL1 is a distance between the object side surface S12 of the first lens L11 to an image plane IMA1 along the optical axis OA1, $R1_{41}$ is a radius of curvature of the object side surface S18 of the fourth lens L14, $R1_{42}$ is a radius of curvature of the image side surface S19 of the fourth lens L14, $R1_{61}$ is a radius of curvature of the object side surface S112 of the sixth lens L16, $R1_{62}$ is a radius of curvature of the image side surface S113 of the sixth lens L16, $f1_{123}$ is an effective focal length of the combination of the first lens L11, the second lens L12 and the third lens L13, $f1_{456}$ is an effective focal length of the combination of the fourth lens L14, the fifth lens L15 and the sixth lens L16, $f1_4$ is an effective focal length of the fourth lens L14, $f1_5$ is an effective focal length of the fifth lens L15, and $f1_6$ is an effective focal length of the sixth lens L16.

By the above design of the lenses and stop ST1, the lens assembly 1 is provided with a shortened total lens length, an increased field of view, an effective corrected aberration, and an increased resolution.

In order to achieve the above purposes and effectively enhance the optical performance, the lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens.

TABLE 1

Effective Focal Length = 4.202 mm F-number = 2.2
Field of View = 68.8° Total Lens Length = 5.123 mm

| Surface Number | Radius of Curvature (mm) | Thickness (mm) | Nd | Vd | Remark |
|---|---|---|---|---|---|
| S11 | ∞ | −0.307 | | | Stop ST1 |
| S12 | 1.625 | 0.580 | 1.535 | 55.7 | The First Lens L11 |
| S13 | −14.725 | 0.030 | | | |
| S14 | 3.523 | 0.250 | 1.636 | 23.9 | The Second Lens L12 |
| S15 | 1.561 | 0.352 | | | |
| S16 | −14.348 | 0.379 | 1.535 | 55.7 | The Third Lens L13 |
| S17 | −2.934 | 0.152 | | | |
| S18 | −3.547 | 0.264 | 1.535 | 55.7 | The Fourth Lens L14 |
| S19 | −4.070 | 0.254 | | | |
| S110 | −0.873 | 0.339 | 1.636 | 23.9 | The Fifth Lens L15 |
| S111 | −1.148 | 0.030 | | | |
| S112 | 2.377 | 1.114 | 1.535 | 55.7 | The Sixth Lens L16 |
| S113 | 2.041 | 0.613 | | | |
| S114 | ∞ | 0.210 | 1.517 | 64.2 | Optical Filter OF1 |
| S115 | ∞ | 0.556 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S12 | 4.5634E−04 | 6.7167E−03 | 1.8538E−02 | −3.9176E−02 | −1.0811E−02 | 9.5404E−02 | −7.4078E−02 | 0.0000E+00 |
| S13 | 0.0000E+00 | −3.2620E−02 | 1.4642E−01 | −1.6300E−01 | 2.0028E−02 | 5.2441E−02 | −4.0075E−02 | 0.0000E+00 |
| S14 | −5.2632E+01 | −7.4191E−02 | 8.1761E−02 | 4.9488E−02 | −1.6519E−01 | 5.8298E−02 | 2.1197E−02 | 0.0000E+00 |
| S15 | −6.1164E+00 | −1.1837E−02 | 4.7243E−03 | 1.6720E−01 | −2.6924E−01 | 1.7021E−01 | −1.9152E−02 | 0.0000E+00 |
| S16 | 0.0000E+00 | −9.8055E−03 | −5.4116E−02 | −6.4053E−03 | 5.7636E−02 | −5.9983E−03 | −8.5519E−03 | 0.0000E+00 |
| S17 | −1.5837E+01 | −4.8321E−02 | −6.4782E−02 | 2.0745E−02 | −2.0880E−03 | 1.8645E−02 | 2.0068E−04 | 0.0000E+00 |
| S18 | 0.0000E+00 | −1.0989E−01 | −1.0395E−01 | 6.0374E−02 | −4.9845E−02 | 3.0895E−02 | 6.9315E−02 | −4.1320E−02 |
| S19 | 2.1865E+00 | −1.0633E−01 | −2.8371E−02 | 2.7606E−02 | 3.4445E−02 | −1.0053E−02 | 6.4780E−05 | 9.1006E−04 |
| S110 | −4.3343E+00 | −5.2276E−02 | −2.3355E−03 | 1.0021E−01 | −5.1263E−02 | −1.8825E−03 | 4.9852E−03 | −1.4282E−03 |
| S111 | −7.8791E−01 | 1.3142E−01 | −4.1943E−02 | 2.9576E−02 | 9.6793E−03 | −4.6123E−03 | −3.7577E−03 | 1.2398E−03 |
| S112 | −2.7202E+01 | −1.5524E−01 | 9.3582E−02 | −6.5798E−02 | 3.8498E−02 | −1.2233E−02 | 1.9047E−03 | −1.1566E−04 |
| S113 | −9.7729E+00 | −6.6804E−02 | 2.9213E−02 | −1.3656E−02 | 4.4551E−03 | −9.0849E−04 | 1.0171E−04 | −4.6969E−06 |

For the lens assembly 1 of the first embodiment, the effective focal length f1 of the lens assembly 1 is equal to 4.202 mm, the distance TTL1 between the object side surface S12 of the first lens L11 to the image plane IMA1 along the optical axis OA1 is equal to 5.123 mm, the radius of curvature $R1_{41}$ of the object side surface S18 of the fourth lens L14 is equal to −3.54677 mm, the radius of curvature $R1_{42}$ of the image side surface S19 of the fourth lens L14 is equal to −4.07026 mm, the radius of curvature $R1_{61}$ of the object side surface S112 of the sixth lens L16 is equal to 2.37665 mm, the radius of curvature $R1_{62}$ of the image side surface S113 of the sixth lens L16 is equal to 2.04121 mm, the effective focal length $f1_{123}$ of the combination of the first lens L11, the second lens L12 and the third lens L13 is equal to 3.4026 mm, the effective focal length $f1_{456}$ of the combination of the fourth lens L14, the fifth lens L15 and the sixth lens L16 is equal to −8.2153 mm, the effective focal length $f1_4$ of the fourth lens L14 is equal to −62.5167 mm, the effective focal length $f1_5$ of the fifth lens L15 is equal to −11.00288 mm, and the effective focal length $f1_6$ of the sixth lens L16 is equal to 171.08238 mm. According to the above data, the following values can be obtained:

$$f1/TTL1=0.8201,$$

$$|(R1_{41}-R1_{42})/(R1_{41}+R1_{42})|+|(R1_{61}-R1_{62})/(R1_{61}+R1_{62})|=0.1447$$

$$f1_{123}/f1_{456}=-0.4142,$$

$$f1_4/f1=-14.8795,$$

$$f1_5/f1=-2.6188,$$

$$f1_6/f1=40.7191$$

which respectively satisfy the above conditions (1)-(6).

Figure 2A:
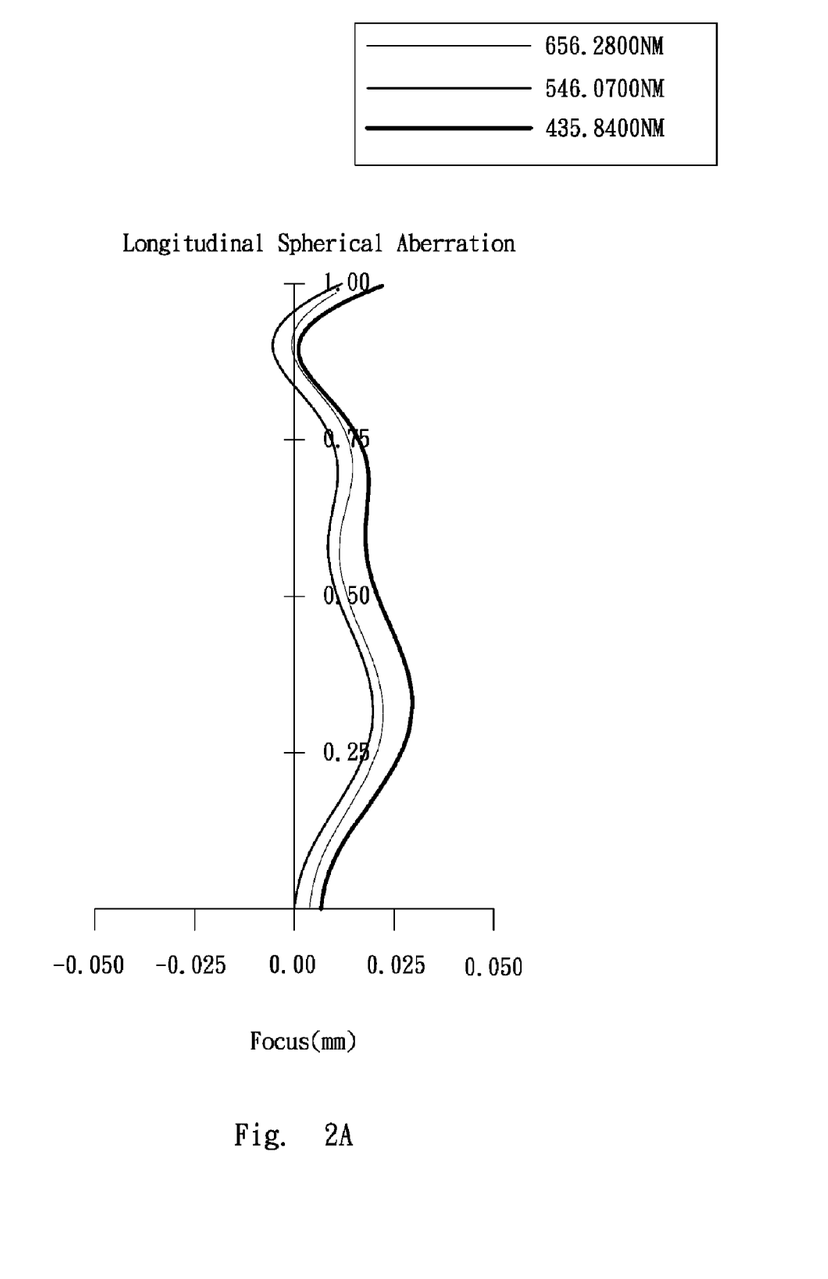
FIG. 2A depicts a longitudinal spherical aberration of the lens assembly in accordance with the first embodiment of the invention.
Figure 2B:
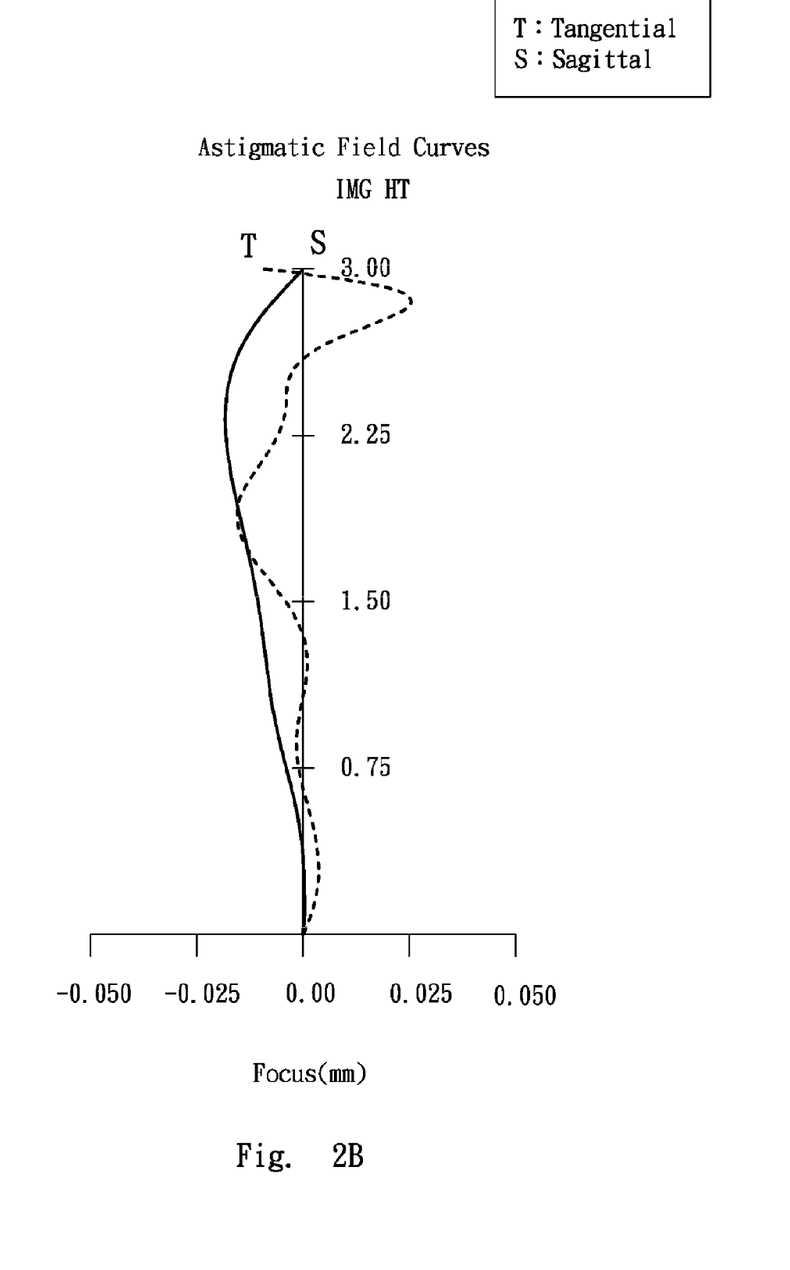
FIG. 2B is an astigmatic field curves diagram of the lens assembly in accordance with the first embodiment of the invention.
Figure 2C:
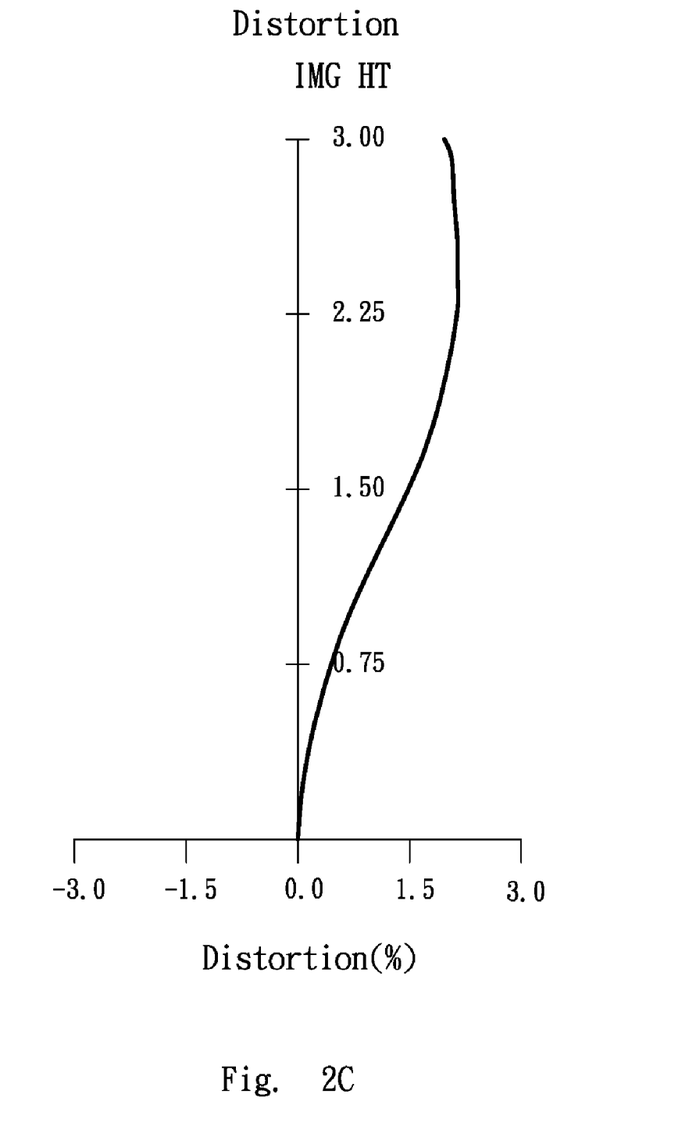
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves of the lens assembly 1 in accordance with the first embodiment of the invention and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges between 0.000 mm and 0.030 mm for the wavelength of 435.8400 nm, 546.0700 nm and 656.2800 nm. It can be seen from FIG. 2B that the astigmatic field curves of tangential direction and sagittal direction in the lens assembly 1 of the first embodiment ranges between −0.025 mm and 0.025 mm for the wavelength of 546.0700 nm. It can be seen from FIG. 2C that the distortion in the lens assembly 1 of the first embodiment ranges between 0% and 2.1% for the wavelength of 546.0700 nm. It is obvious that the longitudinal spherical aberration, the astigmatic field curves and the distortion of the lens assembly 1 of the first embodiment can be corrected effectively. Therefore, the lens assembly 1 of the first embodiment is capable of good optical performance.

Figure 3:
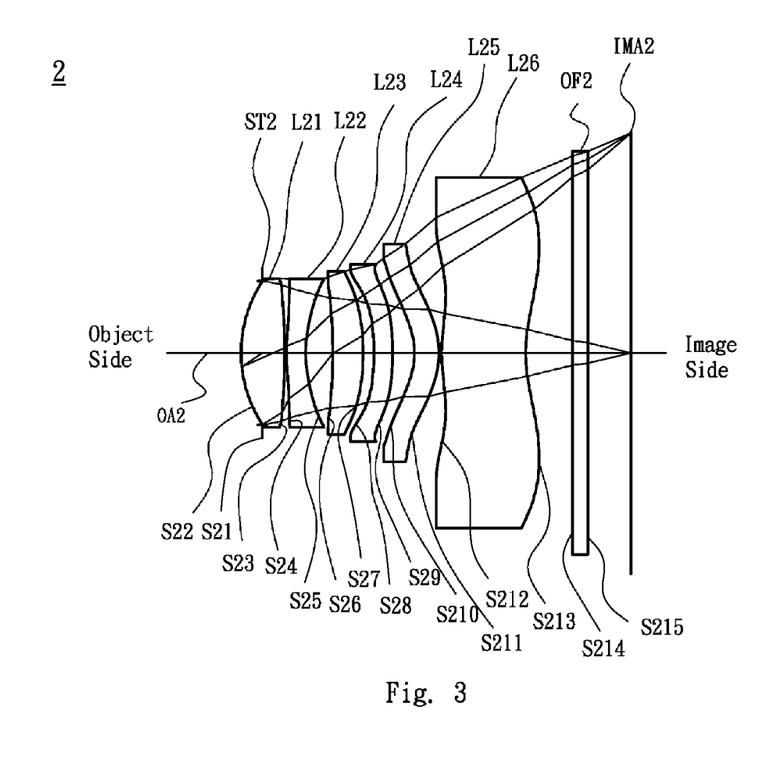
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a stop ST2, a first lens L21, a second lens L22, a third lens L23, a fourth lens L24, a fifth lens L25, a sixth lens L26 and an Optical filter OF2, all of which are arranged in sequence from an object side to an image side along an optical axis OA2. The first lens L21 is made of plastic material and with positive refractive power, wherein the object side surface S22 is a convex surface, the image side surface S23 is a convex surface and both of the object side surface S22 and image side surface S23 are aspheric surfaces. The second lens L22 is made of plastic material and with negative refractive power, wherein the object side surface S24 is a convex surface, the image side surface S25 is a concave surface and both of the object side surface S24 and image side surface S25 are aspheric surfaces. The third lens L23 is made of plastic material and with positive refractive power, wherein the object side surface S26 is a concave surface, the image side surface S27 is a convex surface and both of the object side surface S26 and image side surface S27 are aspheric surfaces. The fourth lens L24 is made of plastic material and with negative refractive power, wherein the object side surface S28 is a concave surface, the image side surface S29 is a convex surface and both of the object side surface S28 and image side surface S29 are aspheric surfaces. The fifth lens L25 is made of plastic material and with negative refractive power, wherein the object side surface S210 is a concave surface, the image side surface S211 is a convex surface and both of the object side surface S210 and image side surface S211 are aspheric surfaces. The sixth lens L26 is made of plastic material and with positive refractive power, wherein the object side surface S212 is a convex surface, the image side surface S213 is a concave surface and both of the object side surface S212 and image side surface S213 are aspheric surfaces. Both of the object side surface S214 and image side surface S215 of the optical filter OF2 are plane surfaces.

In order to maintain excellent optical performance of the lens assembly in accordance with the second embodiment of the invention, the lens assembly 2 must satisfies the following six conditions:

$$0.8104 \leq f2/TTL2 \leq 0.8201 \tag{7}$$

$$0.1375 \leq |(R2_{41}-R2_{42})/(R2_{41}+R2_{42})|+|(R2_{61}-R2_{62})/(R2_{61}+R2_{62})| \leq 0.1694 \tag{8}$$

$$-0.4290 \leq f2_{123}/f2_{456} \leq -0.4127 \tag{9}$$

$$-14.8795 \leq f2_4/f2 \leq -11.913 \tag{10}$$

$$-2.7543 \leq f2_5/f2 \leq -2.2539 \tag{11}$$

$$9.0882 \leq f2_6/f2 \leq 63.4223 \tag{12}$$

wherein f2 is an effective focal length of the lens assembly 2, TTL2 is a distance between the object side surface S22 of the first lens L21 to an image plane IMA2 along the optical axis OA2, $R2_{41}$ is a radius of curvature of the object side surface S28 of the fourth lens L24, $R2_{42}$ is a radius of curvature of the image side surface S29 of the fourth lens L24, $R2_{61}$ is a radius of curvature of the object side surface S212 of the sixth lens L26, $R2_{62}$ is a radius of curvature of the image side surface S213 of the sixth lens L26, $f2_{123}$ is an effective focal length of the combination of the first lens L21, the second lens L22 and the third lens L23, $f2_{456}$ is an effective focal length of the combination of the fourth lens L24, the fifth lens L25 and the sixth lens L26, $f2_4$ is an effective focal length of the fourth lens L24, $f2_5$ is an effective focal length of the fifth lens L25, and $f2_6$ is an effective focal length of the sixth lens L26.

By the above design of the lenses and stop ST2, the lens assembly 2 is provided with a shortened total lens length, an increased field of view, an effective corrected aberration, and an increased resolution.

In order to achieve the above purposes and effectively enhance the optical performance, the lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens.

TABLE 3

Effective Focal Length = 4.212 mm F-number = 2.2
Field of View = 68.6° Total Lens Length = 5.185 mm

| Surface Number | Radius of Curvature (mm) | Thickness (mm) | Nd | Vd | Remark |
|---|---|---|---|---|---|
| S21 | ∞ | −0.281 | | | Stop ST2 |
| S22 | 1.722 | 0.578 | 1.535 | 56.1 | The First Lens L21 |
| S23 | −8.860 | 0.030 | | | |
| S24 | 4.043 | 0.250 | 1.636 | 23.9 | The Second Lens L22 |
| S25 | 1.603 | 0.357 | | | |
| S26 | −9.217 | 0.410 | 1.535 | 56.1 | The Third Lens L23 |
| S27 | −2.586 | 0.139 | | | |
| S28 | −3.540 | 0.250 | 1.535 | 56.1 | The Fourth Lens L24 |
| S29 | −4.179 | 0.293 | | | |
| S210 | −0.852 | 0.322 | 1.535 | 56.1 | The Fifth Lens L25 |
| S211 | −1.159 | 0.036 | | | |
| S212 | 2.041 | 1.116 | 1.535 | 56.1 | The Sixth Lens L26 |
| S213 | 1.836 | 0.621 | | | |
| S214 | ∞ | 0.210 | 1.517 | 64.2 | Optical Filter OF2 |
| S215 | ∞ | 0.572 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k | A | B | C | D | E | F | G |
|---|---|---|---|---|---|---|---|---|
| S22 | −3.4254E−02 | 5.3371E−03 | 1.7663E−02 | −4.1386E−02 | −1.1859E−02 | 9.5259E−02 | −7.3803E−02 | 0.0000E+00 |
| S23 | 0.0000E+00 | −2.5127E−02 | 1.4430E−01 | −1.6655E−01 | 1.8052E−02 | 5.2890E−02 | −3.7466E−02 | 0.0000E+00 |
| S24 | −8.9339E+01 | −7.6628E−02 | 8.5102E−02 | 5.0746E−02 | −1.6719E−01 | 5.6498E−02 | 2.2167E−02 | 0.0000E+00 |
| S25 | −7.3732E+00 | −1.5086E−02 | 2.4174E−03 | 1.6763E−01 | −2.6778E−01 | 1.7043E−01 | −1.8480E−02 | 0.0000E+00 |
| S26 | 0.0000E+00 | −1.4228E−03 | −5.1471E−02 | −2.2146E−03 | 6.1843E−02 | −4.3513E−03 | −9.7686E−03 | 0.0000E+00 |
| S27 | −1.4241E+01 | −4.1021E−02 | −5.8370E−02 | 1.9878E−02 | −8.9884E−03 | 1.4296E−02 | 2.0152E−03 | 0.0000E+00 |
| S28 | 0.0000E+00 | −9.8116E−02 | −1.0081E−01 | 5.5904E−02 | −5.1849E−02 | 3.1942E−02 | 7.2341E−02 | −3.7625E−02 |
| S29 | 2.4427E+00 | −1.0931E−01 | −2.8527E−02 | 2.8361E−02 | 3.5475E−02 | −9.3131E−03 | 4.7973E−04 | 1.0709E−03 |
| S210 | −5.0427E+00 | −4.9546E−02 | −2.5777E−03 | 1.0003E−01 | −5.1399E−02 | −1.9461E−03 | 5.0424E−03 | −1.2073E−03 |
| S211 | −7.8304E−01 | 1.2930E−01 | −4.1565E−02 | 2.9985E−02 | 9.8155E−03 | −4.6056E−03 | −3.7856E−03 | 1.2126E−03 |
| S212 | −2.4979E+01 | −1.5475E−01 | 9.3654E−02 | −6.5798E−02 | 3.8497E−02 | −1.2234E−02 | 1.9044E−03 | −1.1580E−04 |
| S213 | −8.4275E+00 | −6.4113E−02 | 2.9272E−02 | −1.3648E−02 | 4.4605E−03 | −9.0768E−04 | 1.0173E−04 | −4.7341E−06 |

For the lens assembly 2 of the second embodiment, the effective focal length f2 of the lens assembly 2 is equal to 4.212 mm, the distance TTL2 between the object side surface S22 of the first lens L21 to the image plane IMA2 along the optical axis OA2 is equal to 5.185 mm, the radius of curvature $R2_{41}$ of the object side surface S28 of the fourth lens L24 is equal to −3.54017 mm, the radius of curvature $R2_{42}$ of the image side surface S29 of the fourth lens L24 is equal to −4.17889 mm, the radius of curvature $R2_{61}$ of the object side surface S212 of the sixth lens L26 is equal to 2.04140 mm, the radius of curvature $R2_{62}$ of the image side surface S213 of the sixth lens L26 is equal to 1.83593 mm, the effective focal length $f2_{123}$ of the combination of the first lens L21, the second lens L22 and the third lens L23 is equal to 3.4926 mm, the effective focal length $f2_{456}$ of the combination of the fourth lens L24, the fifth lens L25 and the sixth lens L26 is equal to −8.1406 mm, the effective focal length $f2_4$ of the fourth lens L24 is equal to −50.1648 mm, the effective focal length $f2_5$ of the fifth lens L25 is equal to −9.49230 mm, and the effective focal length $f2_6$ of the sixth lens L26 is equal to 38.27514 mm. According to the above data, the following values can be obtained:

$f2/TTL2 = 0.8122$, $|(R2_{41}-R2_{42})/(R2_{41}+R2_{42})|+|(R2_{61}-R2_{62})/(R2_{61}+R2_{62})|=0.1375$ $f2_{123}/f2_{456} = -0.4290$, $f2_4/f2 = -11.9113$, $f2_5/f2 = -2.2539$, $f2_6/f2 = 9.0882$ which respectively satisfy the above conditions (7)-(12).

Figure 4A:
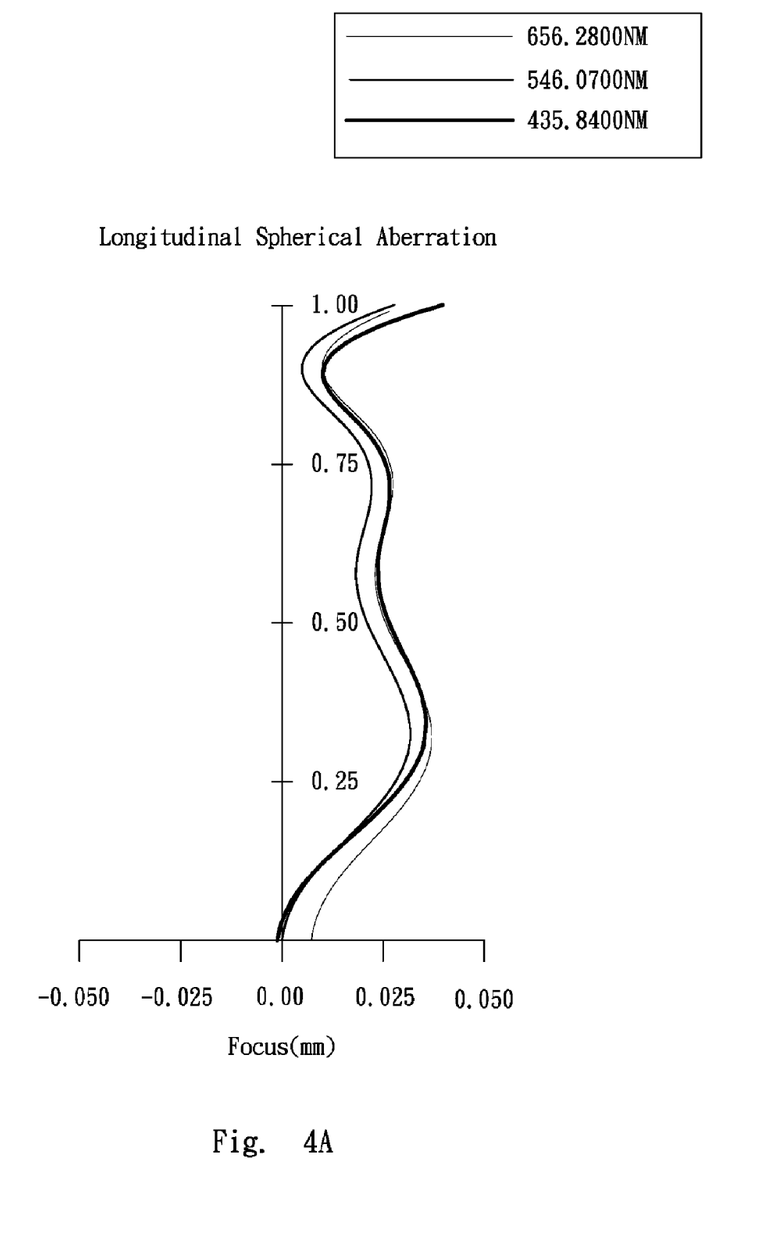
FIG. 4A depicts a longitudinal spherical aberration of the lens assembly in accordance with the second embodiment of the invention.
Figure 4B:
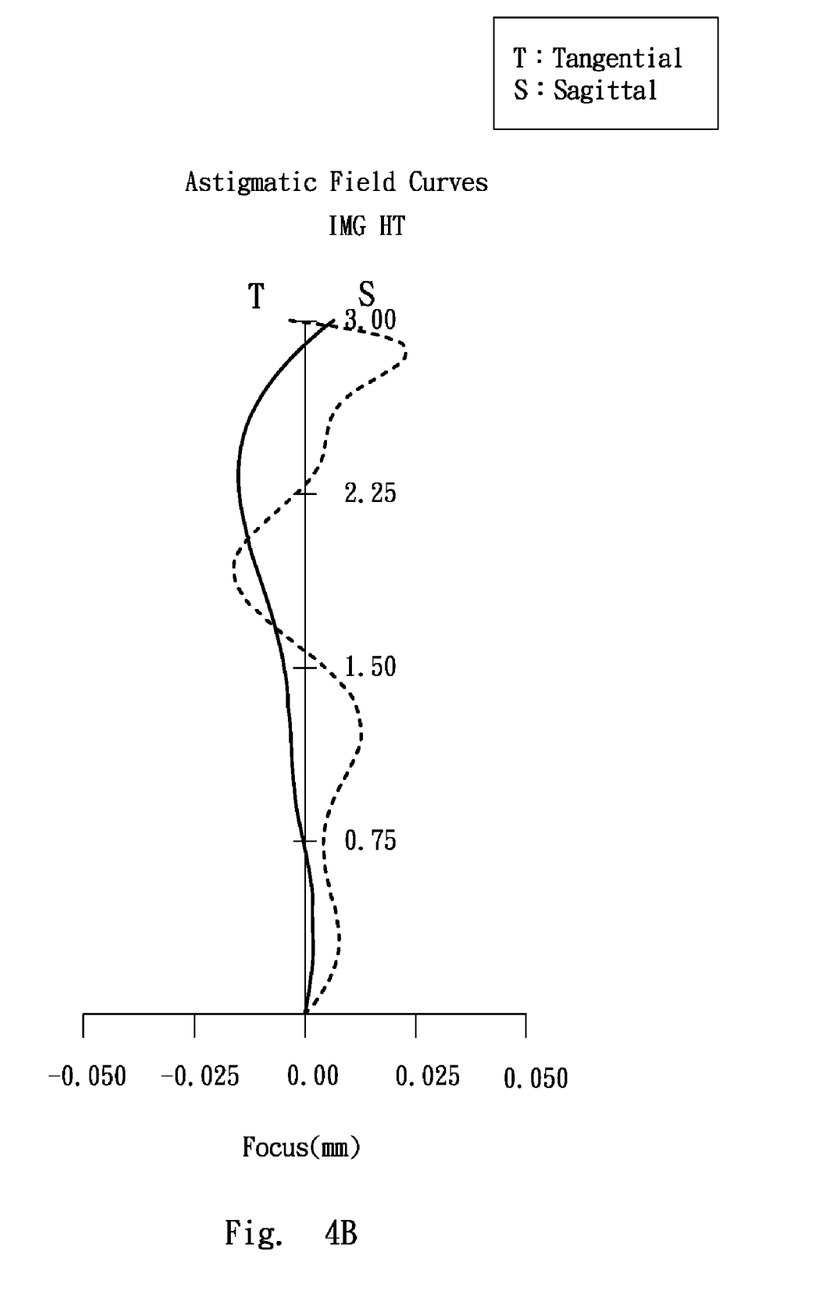
FIG. 4B is an astigmatic field curves diagram of the lens assembly in accordance with the second embodiment of the invention.
Figure 4C:
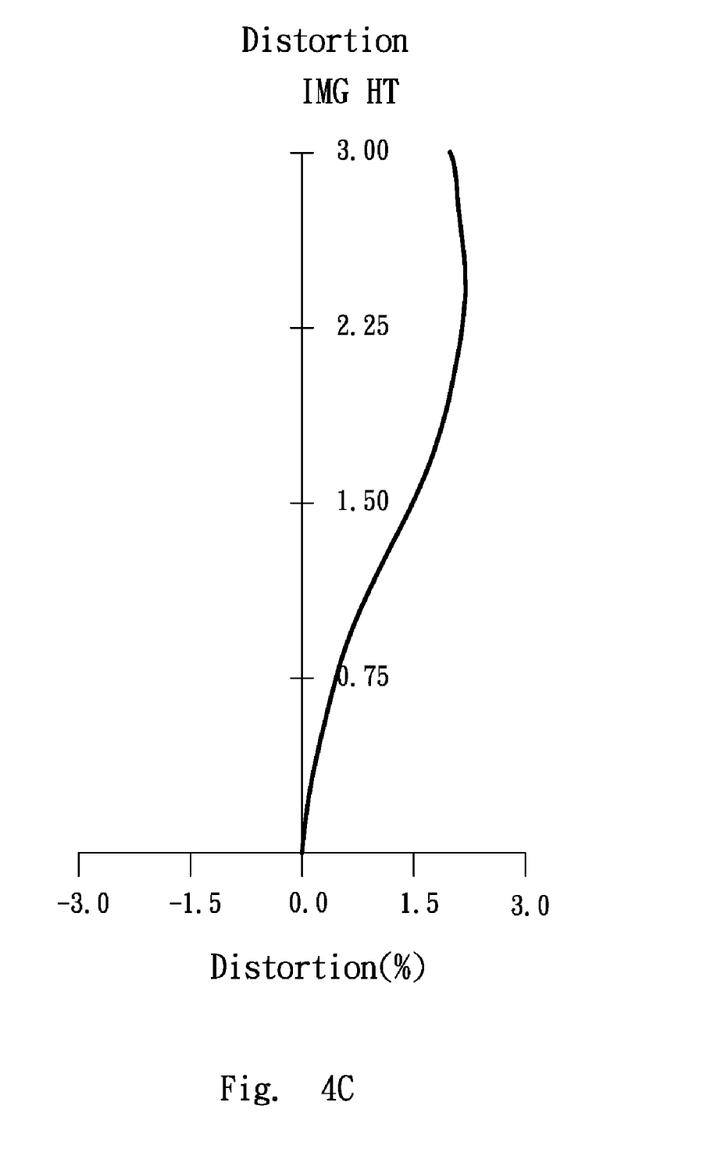
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves of the lens assembly 2 in accordance with the second embodiment of the invention and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges between −0.002 mm and 0.040 mm for the wavelength of 435.8400 nm, 546.0700 nm and 656.2800 nm. It can be seen from FIG. 4B that the astigmatic field curves of tangential direction and sagittal direction in the lens assembly 2 of the second embodiment ranges between −0.025 mm and 0.025 mm for the wavelength of 546.0700 nm. It can be seen from FIG. 4C that the distortion in the lens assembly 2 of the second embodiment ranges between 0% and 2.0% for the wavelength of 546.0700 nm. It is obvious that the longitudinal spherical aberration, the astigmatic field curves and the distortion of the lens assembly 2 of the second embodiment can be corrected effectively. Therefore, the lens assembly 2 of the second embodiment is capable of good optical performance.

Figure 5:
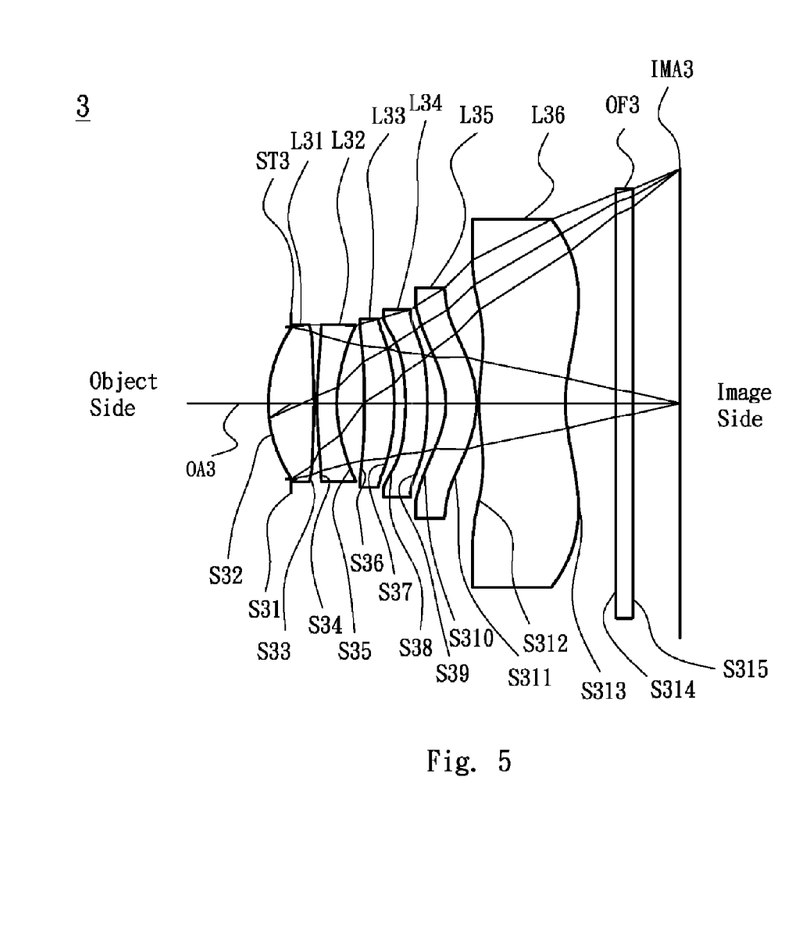
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a stop ST3, a first lens L31, a second lens L32, a third lens L33, a fourth lens L34, a fifth lens L35, a sixth lens L36 and an Optical filter OF3, all of which are arranged in sequence from an object side to an image side along an optical axis OA3. The first lens L31 is made of plastic material and with positive refractive power, wherein the object side surface S32 is a convex surface, the image side surface S33 is a convex surface and both of the object side surface S32 and image side surface S33 are aspheric surfaces. The second lens L32 is made of plastic material and with negative refractive power, wherein the object side surface S34 is a convex surface, the image side surface S35 is a concave surface and both of the object side surface S34 and image side surface S35 are aspheric surfaces. The third lens L33 is made of plastic material and with positive refractive power, wherein the object side surface S36 is a concave surface, the image side surface S37 is a convex surface and both of the object side surface S36 and image side surface S37 are aspheric surfaces. The fourth lens L34 is made of plastic material and with negative refractive power, wherein the object side surface S38 is a concave surface, the image side surface S39 is a convex surface and both of the object side surface S38 and image side surface S39 are aspheric surfaces. The fifth lens L35 is made of plastic material and with negative refractive power, wherein the object side surface S310 is a concave surface, the image side surface S311 is a convex surface and both of the object side surface S310 and image side surface S311 are aspheric surfaces. The sixth lens L36 is made of plastic material and with positive refractive power, wherein the object side surface S312 is a convex surface, the image side surface S313 is a concave surface and both of the object side surface S312 and image side surface S313 are aspheric surfaces. Both of the object side surface S314 and image side surface S315 of the optical filter OF3 are plane surfaces.

In order to maintain excellent optical performance of the lens assembly in accordance with the third embodiment of the invention, the lens assembly 3 must satisfies the following six conditions:

$$0.8104 \leq f3/TTL3 \leq 0.8201 \tag{13}$$

$$0.1375 \leq |(R3_{41}-R3_{42})/(R3_{41}+R3_{42})|+|(R3_{61}-R3_{62})/(R3_{61}+R3_{62})| \leq 0.1694 \tag{14}$$

$$-0.4290 \leq f3_{123}/f3_{456} \leq -0.4127 \tag{15}$$

$$-14.8795 \leq f3_4/f3 \leq -11.913 \tag{16}$$

$$-2.7543 \leq f3_5/f3 \leq -2.2539 \tag{17}$$

$$9.0882 \leq f3_6/f3 \leq 63.4223 \tag{18}$$

wherein f3 is an effective focal length of the lens assembly 3, TTL3 is a distance between the object side surface S32 of the first lens L31 to an image plane IMA3 along the optical axis OA3, $R3_{41}$ is a radius of curvature of the object side surface S38 of the fourth lens L34, $R3_{42}$ is a radius of curvature of the image side surface S39 of the fourth lens L34, $R3_{61}$ is a radius of curvature of the object side surface S312 of the sixth lens L36, $R3_{62}$ is a radius of curvature of the image side surface S313 of the sixth lens L36, $f3_{123}$ is an effective focal length of the combination of the first lens L31, the second lens L32 and the third lens L33, $f3_{456}$ is an effective focal length of the combination of the fourth lens L34, the fifth lens L35 and the sixth lens L36, $f3_4$ is an effective focal length of the fourth lens L34, $f3_5$ is an effective focal length of the fifth lens L35, and $f3_6$ is an effective focal length of the sixth lens L36.

By the above design of the lenses and stop ST3, the lens assembly 3 is provided with a shortened total lens length, an increased field of view, an effective corrected aberration, and an increased resolution.

In order to achieve the above purposes and effectively enhance the optical performance, the lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens.

TABLE 5

Effective Focal Length = 4.179 mm F-number = 2.2
Field of View = 69.1° Total Lens Length = 5.157 mm

| Surface Number | Radius of Curvature (mm) | Thickness (mm) | Nd | Vd | Remark |
|---|---|---|---|---|---|
| S31 | ∞ | −0.283 | | | Stop ST3 |
| S32 | 1.692 | 0.571 | 1.532 | 56.0 | The First Lens L31 |
| S33 | −11.080 | 0.035 | | | |
| S34 | 3.396 | 0.250 | 1.640 | 23.5 | The Second Lens L32 |
| S35 | 1.545 | 0.345 | | | |
| S36 | −12.358 | 0.380 | 1.532 | 56.0 | The Third Lens L33 |
| S37 | −2.679 | 0.135 | | | |
| S38 | −3.806 | 0.275 | 1.532 | 56.0 | The Fourth Lens L34 |
| S39 | −4.518 | 0.233 | | | |
| S310 | −0.915 | 0.384 | 1.640 | 23.5 | The Fifth Lens L35 |
| S311 | −1.216 | 0.030 | | | |
| S312 | 2.236 | 1.083 | 1.532 | 56.0 | The Sixth Lens L36 |
| S313 | 1.890 | 0.632 | | | |
| S314 | ∞ | 0.210 | 1.517 | 64.2 | Optical Filter OF3 |
| S315 | ∞ | 0.594 | | | |

The aspheric surface sag z of each lens in table 5 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 6.

TABLE 6

| Surface Number | k | A | B | C | D | E | F | G |
|---|---|---|---|---|---|---|---|---|
| S32 | −2.4935E−02 | 6.1982E−03 | 1.6672E−02 | −4.0138E−02 | −1.1146E−02 | 9.4442E−02 | −7.5334E−02 | 0.0000E+00 |
| S33 | 0.0000E+00 | −3.0405E−02 | 1.4351E−01 | −1.6538E−01 | 1.8838E−02 | 5.2331E−02 | −3.8476E−02 | 0.0000E+00 |
| S34 | −5.1838E+01 | −7.4446E−02 | 7.9806E−02 | 4.8021E−02 | −1.6577E−01 | 5.9351E−02 | 2.2383E−02 | 0.0000E+00 |
| S35 | −6.4561E+00 | −1.9008E−02 | 1.8022E−04 | 1.6581E−01 | −2.7191E−01 | 1.6690E−01 | −1.3902E−02 | 0.0000E+00 |

TABLE 6-continued

| Surface Number | k | A | B | C | D | E | F | G |
|---|---|---|---|---|---|---|---|---|
| S36 | 0.0000E+00 | −4.3935E−03 | −6.1166E−02 | −5.2659E−03 | 6.4856E−02 | 2.3961E−04 | −8.5278E−03 | 0.0000E+00 |
| S37 | −1.6306E+01 | −4.9958E−02 | −6.1745E−02 | 2.4649E−02 | −2.8158E−04 | 2.1280E−02 | 6.4907E−03 | 0.0000E+00 |
| S38 | 0.0000E+00 | −1.0094E−01 | −9.5643E−02 | 5.9408E−02 | −4.9779E−02 | 3.3170E−02 | 7.2937E−02 | −3.7742E−02 |
| S39 | 1.0634E+00 | −1.0246E−01 | −2.5830E−02 | 2.8091E−02 | 3.4309E−02 | −1.0113E−02 | 1.0099E−04 | 1.0632E−03 |
| S310 | −4.9267E+00 | −4.0937E−02 | −2.8879E−03 | 1.0001E−01 | −5.1184E−02 | −1.9678E−03 | 4.9226E−03 | −1.2867E−03 |
| S311 | −7.6844E−01 | 1.2842E−01 | −4.1892E−02 | 2.9362E−02 | 9.6077E−03 | −4.6092E−03 | −3.7492E−03 | 1.2418E−03 |
| S312 | −2.2471E+01 | −1.5481E−01 | 9.3432E−02 | −6.5842E−02 | 3.8488E−02 | −1.2234E−02 | 1.9050E−03 | −1.1546E−04 |
| S313 | −9.2959E+00 | −6.6522E−02 | 2.9355E−02 | −1.3680E−02 | 4.4527E−03 | −9.0839E−04 | 1.0176E−04 | −4.7031E−06 |

For the lens assembly 3 of the third embodiment, the effective focal length f3 of the lens assembly 3 is equal to 4.179 mm, the distance TTL3 between the object side surface S32 of the first lens L31 to the image plane IMA3 along the optical axis OA3 is equal to 5.157 mm, the radius of curvature $R3_{41}$ of the object side surface S38 of the fourth lens L34 is equal to −3.80604 mm, the radius of curvature $R3_{42}$ of the image side surface S39 of the fourth lens L34 is equal to −4.51819 mm, the radius of curvature $R3_{61}$ of the object side surface S312 of the sixth lens L36 is equal to 2.23621 mm, the radius of curvature $R3_{62}$ of the image side surface S313 of the sixth lens L36 is equal to 1.89031 mm, the effective focal length $f3_{123}$ of the combination of the first lens L31, the second lens L32 and the third lens L33 is equal to 3.3528 mm, the effective focal length $f3_{456}$ of the combination of the fourth lens L34, the fifth lens L35 and the sixth lens L36 is equal to −8.1241 mm, the effective focal length $f3_4$ of the fourth lens L34 is equal to −52.4200 mm, the effective focal length $f3_5$ of the fifth lens L35 is equal to −11.51063 mm, and the effective focal length $f3_6$ of the sixth lens L36 is equal to 265.05399 mm. According to the above data, the following values can be obtained:

$f3/TTL3=0.8104$, $|(R3_{41}−R3_{42})/(R3_{41}+R3_{42})|+|(R3_{61}−R3_{62})/(R3_{61}+R3_{62})|=0.1694$ $f3_{123}/f3_{456}=−0.4127$, $f3_4/f3=−12.5431$, $f3_5/f3=−2.7543$, $f3_6/f3=63.4223$ which respectively satisfy the above conditions (13)-(18).

Figure 6A:
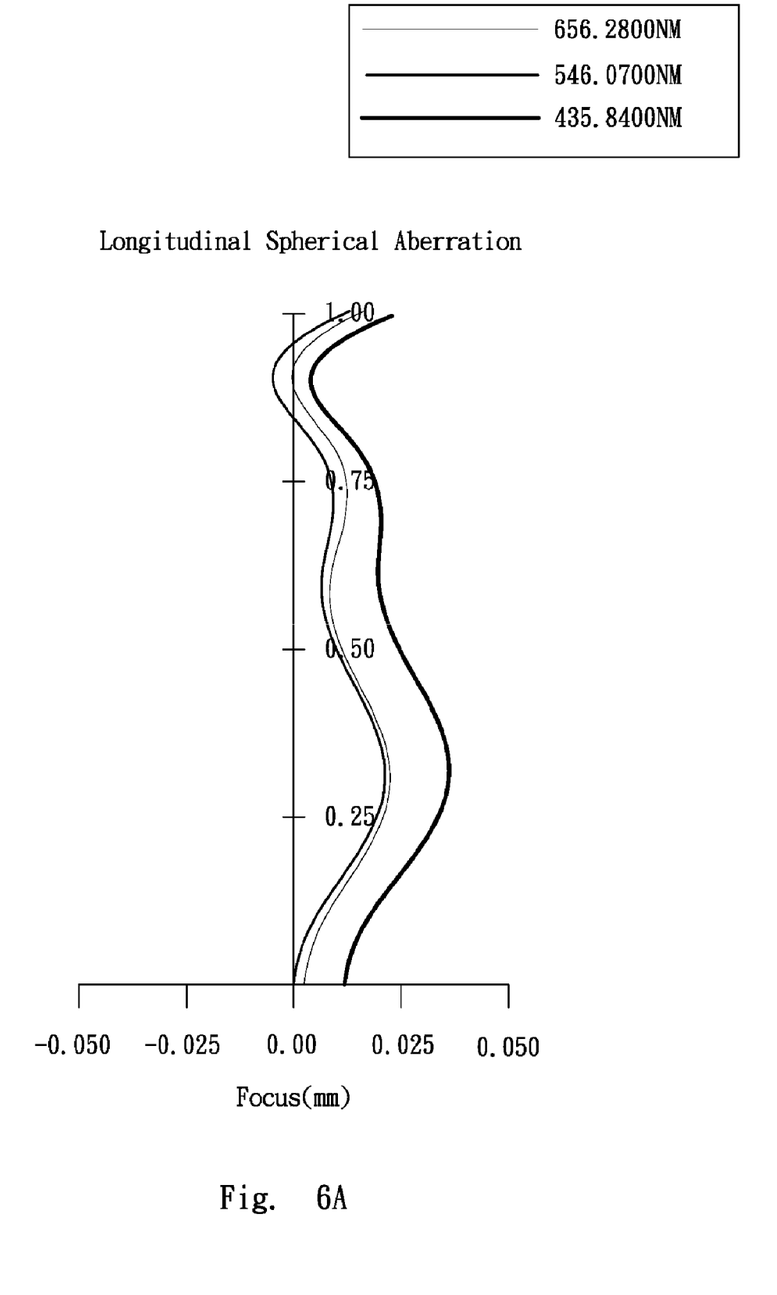
FIG. 6A depicts a longitudinal spherical aberration of the lens assembly in accordance with the third embodiment of the invention.
Figure 6B:
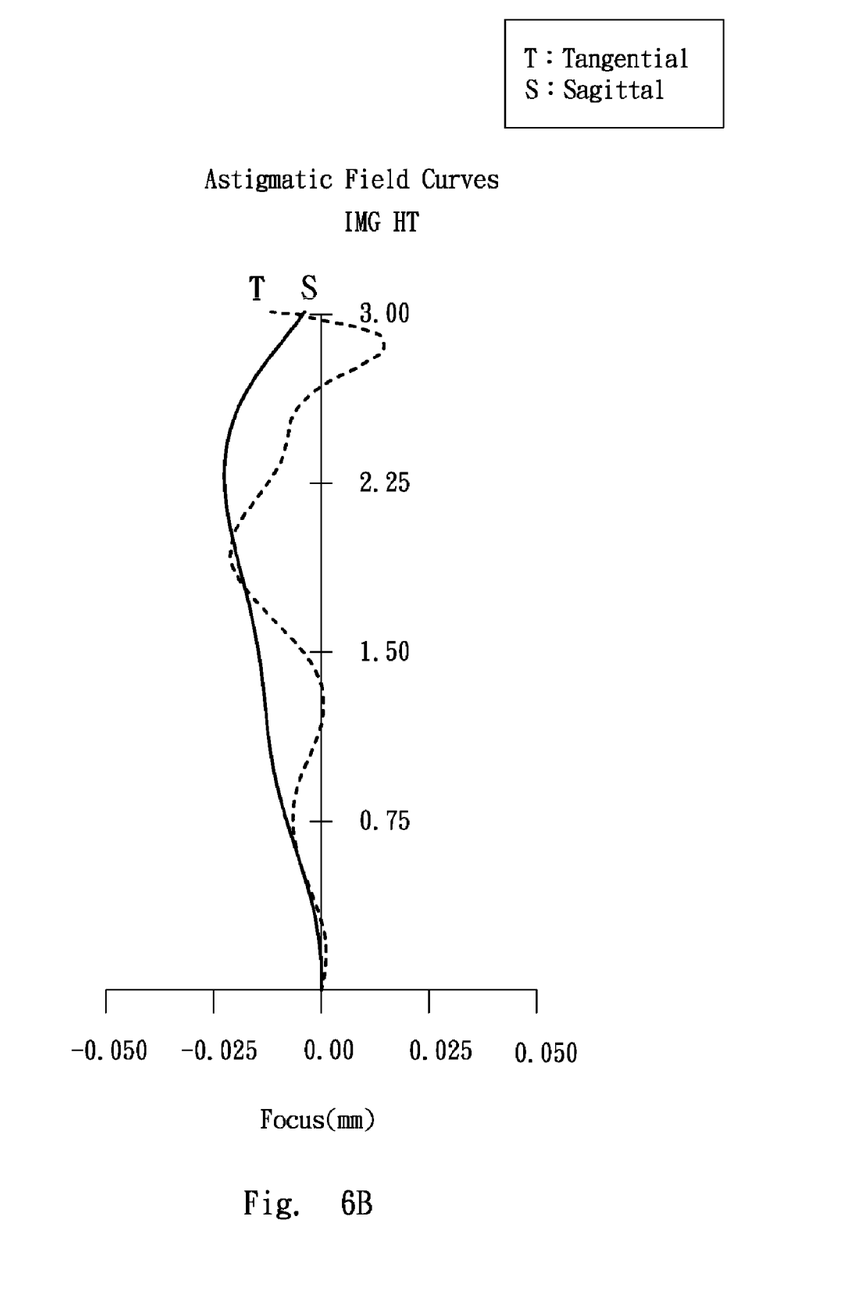
FIG. 6B is an astigmatic field curves diagram of the lens assembly in accordance with the third embodiment of the invention.
Figure 6C:
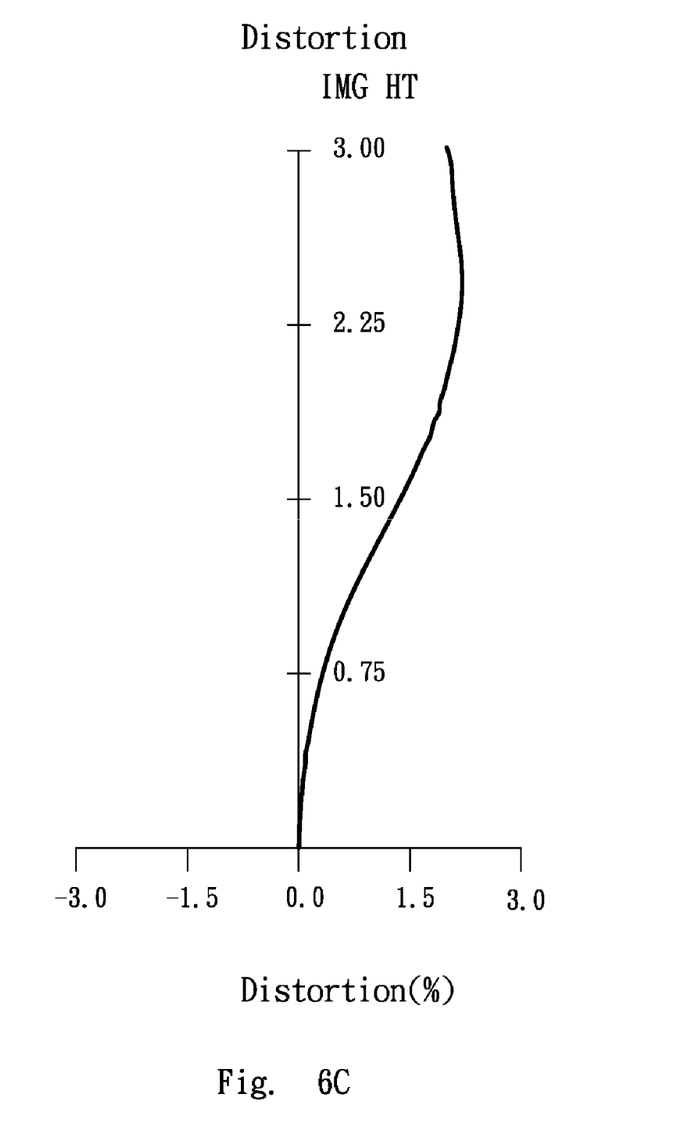
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a longitudinal spherical aberration diagram of the lens assembly 3 in accordance with the third embodiment of the invention, FIG. 6B shows an astigmatic field curves of the lens assembly 3 in accordance with the third embodiment of the invention and FIG. 6C shows a distortion diagram of the lens assembly 3 in accordance with the third embodiment of the invention.

It can be seen from FIG. 6A that the longitudinal spherical aberration in the lens assembly 3 of the third embodiment ranges between 0.000 mm and 0.038 mm for the wavelength of 435.8400 nm, 546.0700 nm and 656.2800 nm. It can be seen from FIG. 6B that the astigmatic field curves of tangential direction and sagittal direction in the lens assembly 3 of the third embodiment ranges between −0.025 mm and 0.025 mm for the wavelength of 546.0700 nm. It can be seen from FIG. 6C that the distortion in the lens assembly 3 of the third embodiment ranges between 0% and 2.1% for the wavelength of 546.0700 nm. It is obvious that the longitudinal spherical aberration, the astigmatic field curves and the distortion of the lens assembly 3 of the third embodiment can be corrected effectively. Therefore, the lens assembly 3 of the third embodiment is capable of good optical performance.

In the above embodiments, all the object side surfaces and image side surfaces of the first, second, third, fourth, fifth and sixth lens are aspheric surfaces. However, it has the same effect and falls into the scope of the invention that any of the object side surfaces and image side surfaces of the first, second, third, fourth, fifth and sixth lens are changed into spherical surfaces.

What is claimed is:

1. A lens assembly comprising a first lens, a second lens, a third lens, a fourth lens, a fifth lens and a sixth lens, all of which are arranged in sequence from an object side to an image side along an optical axis, wherein:
   the first lens is a biconvex lens with positive refractive power;
   the second lens is a meniscus lens with negative refractive power and comprises a convex surface facing the object side and a concave surface facing the image side;
   the third lens is with positive refractive power and comprises a convex surface facing the image side;
   the fourth lens is a meniscus lens with negative refractive power and comprises a concave surface facing the object side and a convex surface facing the image side;
   the fifth lens is a meniscus lens with negative refractive power and comprises a concave surface facing the object side and a convex surface facing the image side; and
   the sixth lens is a meniscus lens with positive refractive power and comprises a convex surface facing the object side and a concave surface facing the image side.

2. The lens assembly as claimed in claim 1, wherein the lens assembly satisfies:

$0.8104 \leq f/TTL \leq 0.8201$, wherein f is an effective focal length of the lens assembly and TTL is a distance from an object side surface of the first lens to an image plane along the optical axis.

3. The lens assembly as claimed in claim 1, wherein the fourth lens and the sixth lens satisfy:

$0.1375 \leq |(R_{41}−R_{42})/(R_{41}+R_{42})|+|(R_{61}−R_{62})/(R_{61}+R_{62})| \leq 0.1694$, wherein $R_{41}$ is a radius of curvature of the object side surface of the fourth lens, $R_{42}$ is a radius of curvature of the image side surface of the fourth lens, $R_{61}$ is a radius of curvature of the object side surface of the sixth lens and $R_{62}$ is a radius of curvature of the image side surface of the sixth lens.

4. The lens assembly as claimed in claim 1, wherein the first lens, the second lens, the third lens, the fourth lens, the fifth lens and the sixth lens satisfy:

$$-0.4290 \leq f_{123}/f_{456} \leq -0.4127,$$

wherein $f_{123}$ is an effective focal length of the combination of the first lens, the second lens and the third lens and $f_{456}$ is an effective focal length of the combination of the fourth lens, the fifth lens and the sixth lens.

5. The lens assembly as claimed in claim 1, wherein the fourth lens satisfies:

$$-14.8795 \leq f_4/f \leq -11.913,$$

wherein $f_4$ is an effective focal length of the fourth lens and f is an effective focal length of the lens assembly.

6. The lens assembly as claimed in claim 1, wherein the fifth lens satisfies:

$$-2.7543 \leq f_5/f \leq -2.2539,$$

wherein $f_5$ is an effective focal length of the fifth lens and f is an effective focal length of the lens assembly.

7. The lens assembly as claimed in claim 1, wherein the sixth lens satisfies:

$$9.0882 \leq f_6/f \leq 63.4223,$$

wherein $f_6$ is an effective focal length of the sixth lens and f is an effective focal length of the lens assembly.

8. The lens assembly as claimed in claim 1, wherein the first lens further comprising two surfaces, at least one of which is an aspheric surface or both of which are aspheric surfaces.

9. The lens assembly as claimed in claim 1, wherein the convex surface of the second lens is an aspheric surface, or the concave surface of the second lens is an aspheric surface, or both of the convex surface and the concave surface of the second lens are aspheric surfaces.

10. The lens assembly as claimed in claim 1, wherein the third lens further comprising a surface and the surface is an aspheric surface, or the convex surface of the third lens is an aspheric surface, or both of the surface and the convex surface of the third lens are aspheric surfaces.

11. The lens assembly as claimed in claim 1, wherein the concave surface of the fourth lens is an aspheric surface, or the convex surface of the fourth lens is an aspheric surface, or both of the concave surface and the convex surface of the fourth lens are aspheric surfaces.

12. The lens assembly as claimed in claim 1, wherein the concave surface of the fifth lens is an aspheric surface, or the convex surface of the fifth lens is an aspheric surface, or both of the concave surface and the convex surface of the fifth lens are aspheric surfaces.

13. The lens assembly as claimed in claim 1, wherein the convex surface of the sixth lens is an aspheric surface, or the concave surface of the sixth lens is an aspheric surface, or both of the convex surface and the concave surface of the sixth lens are aspheric surfaces.

14. The lens assembly as claimed in claim 1, wherein the first lens, the second lens, the third lens, the fourth lens, the fifth lens and the sixth lens are made of plastic material.

15. The lens assembly as claimed in claim 1, further comprising a stop disposed between the object side and the first lens.

16. The lens assembly as claimed in claim 1, wherein the lens assembly satisfies:

$$0.1375 \leq |(R_{41}-R_{42})/(R_{41}+R_{42})|+|(R_{61}-R_{62})/(R_{61}+R_{62})| \leq 0.1694 \text{ and } -0.4290 \leq f_{123}/f_{456} \leq -0.4127 \text{ wherein } R_{41}$$
is a radius of curvature of the object side surface of the fourth lens, $R_{42}$ is a radius of curvature of the image side surface of the fourth lens, $R_{61}$ is a radius of curvature of the object side surface of the sixth lens, $R_{62}$ is a radius of curvature of the image side surface of the sixth lens, $f_{123}$ is an effective focal length of the combination of the first lens, the second lens and the third lens and $f_{456}$ is an effective focal length of the combination of the fourth lens, the fifth lens and the sixth lens.

17. The lens assembly as claimed in claim 1, wherein the lens assembly satisfies:

$$-0.4290 \leq f_{123}/f_{456} \leq -0.4127$$

and $$-14.8795 \leq f_4/f \leq -11.913,$$

wherein $f_{123}$ is an effective focal length of the combination of the first lens, the second lens and the third lens, $f_{456}$ is an effective focal length of the combination of the fourth lens, the fifth lens and the sixth lens, $f_4$ is an effective focal length of the fourth lens and f is an effective focal length of the lens assembly.

18. The lens assembly as claimed in claim 1, wherein the lens assembly satisfies:
$-14.8795 \leq f_4/f \leq -11.913$ and $-2.7543 \leq f_5/f \leq 2.2539$ wherein $f_4$ is an effective focal length of the fourth lens, $f_5$ is an effective focal length of the fifth lens and f is an effective focal length of the lens assembly.

19. The lens assembly as claimed in claim 1, wherein the lens assembly satisfies:
$-2.7543 \leq f_5/f \leq -2.2539$ and $9.0882 \leq f_6/f \leq 63.4223$ wherein $f_5$ is an effective focal length of the fifth lens, $f_6$ is an effective focal length of the sixth lens and f is an effective focal length of the lens assembly.

20. A lens assembly comprising a first lens, a second lens, a third lens, a fourth lens, a fifth lens and a sixth lens, all of which are arranged in sequence from an object side to an image side along an optical axis, wherein:

the first lens is with positive refractive power;
the second lens is with negative refractive power;
the third lens is with positive refractive power;
the fourth lens is with negative refractive power;
the fifth lens is with negative refractive power;
the sixth lens is with positive refractive power; and
the lens assembly satisfies the following conditions:

$$0.8104 \leq f/TTL \leq 0.8201,$$

$$-0.4290 \leq f_{123}/f_{456} \leq -0.4127,$$

$$-14.8795 \leq f_4/f \leq -11.913,$$

$$-2.7543 \leq f_5/f \leq -2.2539 \text{ and}$$

$$9.0882 \leq f_6/f \leq 63.4223,$$

wherein f is an effective focal length of the lens assembly, TTL is a distance from an object side surface of the first lens to an image plane along the optical axis, $f_{123}$ is an effective focal length of the combination of the first lens, the second lens and the third lens, $f_{456}$ is an effective focal length of the combination of the fourth lens, the fifth lens and the sixth lens, $f_4$ is an effective focal length of the fourth lens, $f_5$ is an effective focal length of the fifth lens and $f_6$ is an effective focal length of the sixth lens.

* * * * *